(12) United States Patent
Flanders et al.

(10) Patent No.: US 11,185,901 B1
(45) Date of Patent: *Nov. 30, 2021

(54) THERMAL IN SITU SUSTAINABLE REMEDIATION SYSTEM AND METHOD FOR GROUNDWATER AND SOIL RESTORATION

(71) Applicant: ARCADIS U.S., INC., Highlands Ranch, CO (US)

(72) Inventors: Cullen Flanders, Tarentum, PA (US); Davinder Singh Randhawa, Powell, OH (US); John LaChance, Lunenburg, MA (US); Philip W. Visser, Arnhem (NL)

(73) Assignee: ARCADIS U.S., INC., Highlands Ranch, CO (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/886,510

(22) Filed: May 28, 2020

(51) Int. Cl.
| | |
|---|---|
| *B09C 1/06* | (2006.01) |
| *F24S 20/00* | (2018.01) |
| *C02F 9/00* | (2006.01) |
| *C02F 1/02* | (2006.01) |
| *C02F 1/72* | (2006.01) |
| *C02F 3/00* | (2006.01) |
| *C02F 1/26* | (2006.01) |
| *B09C 1/00* | (2006.01) |
| *C02F 103/06* | (2006.01) |

(52) U.S. Cl.
CPC .............. *B09C 1/06* (2013.01); *C02F 1/02* (2013.01); *C02F 1/26* (2013.01); *C02F 1/72* (2013.01); *C02F 3/00* (2013.01); *C02F 9/00* (2013.01); *F24S 20/00* (2018.05); *B09C 1/002* (2013.01); *B09C 2101/00* (2013.01); *C02F 2103/06* (2013.01); *C02F 2301/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,574,875 | A | * | 3/1986 | Rawlings ............ F28D 20/0052 165/45 |
| 5,181,655 | A | * | 1/1993 | Bruckelmyer ............ E02D 3/11 165/45 |

(Continued)

*Primary Examiner* — Kyle Armstrong
(74) *Attorney, Agent, or Firm* — Lewis Brisbois Bisgaard & Smith, LLP

(57) ABSTRACT

A closed-loop system and method for heating of target contaminant zones having environmental contaminants of concern present in the groundwater and the soil by thermal conduction, and subsequent enhancements of physical, biological and chemical processes to attenuate, remove and degrade contaminants in the target contaminant treatment zones, is disclosed. The system and method collects solar or other heat and transfers the heat via a closed-loop and a set of borehole exchangers to subsurface soil in the proximity of and/or directly to the target contaminant treatment zones. The target contaminant treatment zone may comprise contaminated soil, contaminated groundwater in an aquifer, or industrial waste comprising water and/or solids. Solar collectors or heat exchangers capturing waste heat from industrial processes may be used as the heat source.

20 Claims, 2 Drawing Sheets

(56) References Cited

U.S. PATENT DOCUMENTS

| | | | | |
|---|---|---|---|---|
| 5,449,113 | A * | 9/1995 | Bruckelmyer | F16L 11/20 |
| | | | | 237/1 R |
| 5,976,867 | A * | 11/1999 | Fliermans | B09C 1/002 |
| | | | | 435/145 |
| 10,384,246 | B2 * | 8/2019 | Flanders | F24S 60/30 |
| 10,688,545 | B2 * | 6/2020 | Flanders | B09C 1/06 |
| 2013/0202363 | A1 * | 8/2013 | Haemers | B09C 1/00 |
| | | | | 405/258.1 |

* cited by examiner

THERMAL IN SITU SUSTAINABLE REMEDIATION SYSTEM AND METHOD FOR GROUNDWATER AND SOIL RESTORATION

RELATED APPLICATION

This application is a continuation of U.S. patent application Ser. No. 16/525,361 filed on Jul. 29, 2019 which is a continuation U.S. patent application Ser. No. 15/519,547, filed Apr. 16, 2017, which claims benefit of a 371 international application No. PCT/US2015/056071, filed Oct. 16, 2015, which claims benefit of U.S. Provisional Application 62/064,954, filed on Oct. 16, 2014 all of which are incorporated by reference herein.

FIELD OF THE INVENTION

The invention relates to heating of target contaminant treatment zones having environmental contaminants of concern present in the groundwater and the soil by thermal conduction, and subsequent enhancement of physical, biological and chemical processes to attenuate, degrade and remove contaminants in the target contaminant treatment zones. The invention provides a system and method that collects solar heat or other heat and transfers that heat via a closed-loop and a set of borehole heat exchangers to subsurface soil in the proximity of the target contaminant treatment zones. The target contaminant treatment zone may comprise contaminated soil, contaminated groundwater in an aquifer, or industrial waste comprising water and/or solids. Solar collectors or heat exchangers collecting waste heat from industrial processes may be used as the heat source.

BACKGROUND

Use of aquifers for groundwater energy storage for heating and cooling buildings in urban settings is common. Environmental engineers and policy makers are recognizing the "positive side-effects" of such open-loop extraction and injection based heating-cooling systems for contaminant attenuation in urban groundwater legacy plumes (European Environment Agency, 2007. State of the Environment. EEA, Copenhagen). Such contaminant attenuation is presumably attributed to enhanced mixing of nutrients and microorganisms in the subsurface (Slenders, H. L. A., Dols, P., Verburg, R., de Vries, A. J (2010), Sustainable synergies for the subsurface: Combining Groundwater Energy with Remediation. Remediation, Spring 2010 (D01:10.1002; Wiley Periodicals, Inc.); Verburg, R., Slenders, H. L. A., Hoekstra, N., Van Nieuwkerk, E., Guijt, R., Van der Mark, B., (2010). Manual BOEG: Underground Thermal Energy and Groundwater Contamination (in Dutch)). These geothermal systems typically operate at low temperatures (<25° C.) and rely heavily on groundwater recirculation (extraction and injection).

In addition, the effects of such open-loop systems on chlorinated hydrocarbon plumes were evaluated by K. G. Zuurbier et al in 2013 where they noted several "negative side-effects" including: limited temperature increase (<15° C.) to stimulate significant thermally-enhanced biodegradation; and a potential for increasing the contaminant plume size (Zuurbier, K. G., Hartog, N., Valster, J., Post, V., Breukelen, B. (2013). The impact of low temperature seasonal aquifer thermal energy storage (SATES) systems on chlorinated solvent contaminated groundwater: Modelling of spreading and degradation). Additionally, such open-loop groundwater pumping based geothermal systems are only feasible in an urban setting where a large number of geothermal-energy-equipped dwellings already exist.

Effects of temperature on contaminant degradation are well documented from various scientific perspectives. Comparing degradation of petroleum hydrocarbons in soils at 10° C. and 20° C., Margesin et al. reported three times faster degradation of benzene, toluene, ethylbenzene and xylene at higher temperature (Margesin, R., Schinner, F. (2001), Biodegradation and bioremediation of hydrocarbons in extreme environments. Applied Microbial Biotechnology Vol. 56 p. 650-663). Studies on biodegradation rates due to increase in temperature (5-50° C.) have shown peak degradation rates at 30 and 40° C. for petroleum hydrocarbons (Xu, J. G. (1997), Biodegradation of Petroleum Hydrocarbons in Soil as Affected by Heating and Forced. Aeration. Journal of Environmental Quality, Vol. 26 No. 6, p. 1511-1516; See also MS thesis—Thermally enhanced bioremediation of LNAPL by Zeman, Natalie Rae, M. S., COLORADO STATE UNIVERSITY, 2013, 139 pages). Additionally, some chlorinated volatile organic compounds, specifically chlorinated alkanes such as 1,1,1-trichloroethane, 1,2-dichloroethane, and carbon tetrachloride, readily undergo hydrolysis reactions under elevated temperatures which can lead to their in-situ destruction (Suthersan, S., Horst, J., Klemmer, M., Malone, D. (2012), Temperature-Activated Auto-Decomposition Reactions: An Underutilized In Situ Remediation Solution. Ground Water Monitoring & Remediation Vol. 32 No. 3 p. 34-40). Both biodegradation and hydrolysis rates, are temperature dependent, and approximately double for each 10° C. increase in temperature.

Successful implementation of ex-situ treatment of mercury contaminated soil by use of a solar reflection approach was reported by Navarro (Application of solar thermal desorption to remediation of mercury-contaminated soils. A. Navarro, I. Canadas, D. Martinez, J. Rodriguez, J. L. Mendoza. Department of Fluid Mechanics, Polytechnic University of Catalonia (UPC), ETSEIT, Colo. n 11, 08222 Terrassa, Barcelona, Spain, Plataforma Solar de Almeria (PSA), Solar Platform of Almeria-CIEMAT, P.O. Box 22, Tabernas, E-04200 Almeria, Spain.)

Physical extraction systems (ex-situ treatment of extracted groundwater or application of air-sparge-soil-vapor extraction) to remediate contamination associated with non-aqueous phase liquids (NAPLs) are a common, traditional and relatively expensive remediation approach. In addition to the capital costs, operation and maintenance costs could be a limiting factor for full scale implementation of such technologies. With increase in groundwater temperature, solubility of NAPLs increases and viscosity decreases (Thermal variation of organic fluid properties and impact on thermal remediation feasibility, DOI: 10.1080/15320389709383566 Brent E. Sleepa & Yanfang Maa pages 281-306)—both of these properties would enhance the recovery of contaminant mass in the dissolved as well as vapor phase, thus significantly improving the treatment efficiency of a physical extraction system. Subsequently, remediation time and life cycle costs of a physical extraction system can be significantly reduced if implemented in conjunction with TISR.

Soil, like all other materials, has thermal properties that allow heat to propagate through the subsurface. Heat transport can occur through two processes: conduction through soil solids (soil particles) and advection through ambient groundwater flow. Heat transfer in soils depends on soil thermal conductivity and heat capacity; these thermal properties are a function of the soil mineral composition, soil density, porosity and saturation with water or air and can be determined by using well established field and laboratory methods or estimated from the existing scientific literature.

Solar thermal collection is a common technique used to collect heat by capturing solar radiation. Globally, solar radiation can vary based on the distance from the equator as well seasonal and/or daily weather changes. Additionally, inherent geothermal heat storage allows for buffering low heat input days caused by low solar radiation on cloudy days and/or due to seasonal changes.

Contaminant degradation and associated remediation is a function of the temperature for both biological and abiotic processes occurring in soils and groundwater. As the subsurface temperature rises, reaction rates increase concurrent with an increased rate of contaminant degradation.

BRIEF SUMMARY OF THE INVENTION

The system and method of the invention comprises a closed-loop system for the capture of solar heat and use of the captured solar heat to increase the temperature of subsurface soil and groundwater by thermal conduction and advection in the proximity of a target contaminant treatment zone, which then heats the target contaminant treatment zone ("Thermal In situ Sustainable Remediation" (TISR)).

The TISR system comprises one or more solar collectors (or other heat sources, e.g. heated fluid comprising waste heat from an industrial process) installed at the ground surface in the proximity of a target contaminant treatment zone; a network of borehole heat exchangers (BHEs) installed in a target heating interval in the subsurface in the proximity of the target contaminant treatment zone; insulated tubing connecting the solar collectors and the BHEs; glycol, water, or other suitable heat-transfer fluid contained within the tubing; and one or more pumps circulating the heat-transfer fluid through the BHEs.

Each BHE comprises thermally conductive, high surface area heating element/coil placed within a targeted heating interval to accomplish effective heat conductance to the soil and groundwater in the subsurface, and also directly to the target contaminant zone.

Vertical thickness of the target contaminant zone is a factor in determining the length of each BHE. Upper sections of the BHE may be insulated to minimize heat transfer to upper layers of soil in the subsurface and to focus delivery of thermal energy to the target contaminant zone.

Heating of the soil in the subsurface in the proximity of a target contaminant treatment zone and/or direct heating results in heating of the target contaminant treatment zone and increasing biological and chemical reaction rates, as well as enhancing physical contaminant mass recovery, thus, resulting in increased contaminant attenuation, removal and degradation within the target contaminant zone.

The closed-loop system operates in the absence of groundwater pumping or direct circulation of fluids through an aquifer. Energy delivery and heating of the subsurface is conducted via thermal conduction due to relatively uniform thermal conductivity of soils and advection due to passive groundwater flow. The entire targeted treatment zone can be heated to the desired treatment temperature via a uniform and controlled process. Three to five times higher remediation rates are believed to occur due to increased reaction rates (both biological and abiotic) heating of the target contaminant in the in situ reactive zone.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
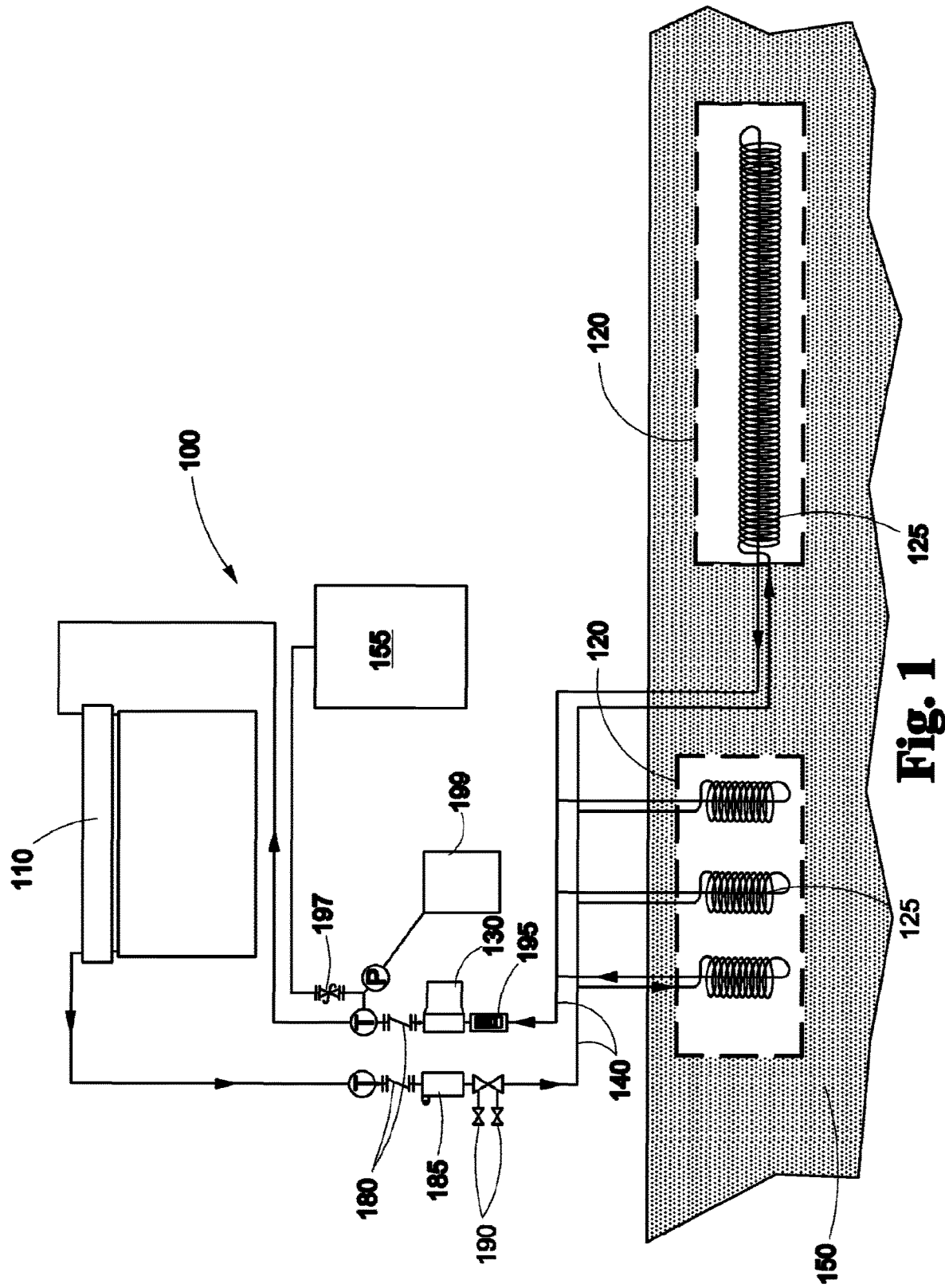
FIG. 1 depicts a schematic layout according to one embodiment of the system of the invention.

The system and method of the invention comprises a closed-loop system for the capture of solar heat and use of the captured solar heat to raise the temperature of subsurface soil and groundwater by thermal conduction in the proximity of a target contaminant treatment zone, which then heats the target contaminant treatment zone ("Thermal In situ Sustainable Remediation" (TISR)).

The TISR system comprises one or more solar collectors (or waste-heat sources) installed at the ground surface in the proximity of a target contaminant treatment zone; a network of borehole heat exchangers (BHEs) installed in a target heating interval in the subsurface in the proximity of the target contaminant treatment zone; tubing connecting the solar collectors and the BHEs; glycol, water, or other suitable heat-transfer fluid contained within the tubing; and one or more pumps circulating the heat-transfer fluid through the BHEs.

Each BHE comprises thermally conductive, high surface area tubing placed within a targeted heating interval to accomplish effective heat conductance to the soil in the subsurface and/or directly to the target contaminant zone.

Solar thermal energy collected by solar collectors are channeled to the subsurface and transferred to the soil and/or target contaminant zone via BHEs. Subsequently, the heat propagates radially outwards from the center of each BHE, heating the target contaminant treatment zone.

Vertical thickness of the target contaminant zone is a factor in determining the length of each BHE. Upper sections of the BHE may be insulated to minimize heat transfer to upper layers of soil in the subsurface and to focus delivery of thermal energy to the target contaminant zone.

Contaminant degradation and removal is a function of the temperature for physical, biological and chemical processes occurring in soils and groundwater. As the subsurface temperature rises, reaction rates increase concurrent with an increased rate of contaminant degradation/removal. Heating of the soil in the subsurface in the proximity of a target contaminant treatment zone and/or direct heating results in increasing physical, biological and abiotic reaction rates, resulting in increased contaminant attenuation and degradation within the target contaminant zone.

The closed-loop system operates in the absence of groundwater pumping or direct circulation of fluids through an aquifer. Energy delivery and heating of the subsurface is conducted via thermal conduction and the relatively uniform thermal conductivity of soils. The entire targeted treatment zone can be heated to the desired treatment temperature via a uniform and controlled process. Three to five times higher remediation rates are believed to occur due to increased reaction rates (both biological and abiotic) via the thermally conductive heating of the target contaminant in situ reactive zone.

In one embodiment, the heat source comprises a solar collector or a series thereof that harvest heat from the sun. In one embodiment, the target contaminant treatment zone comprises groundwater in an aquifer. In one embodiment, the target contaminant treatment zone comprises groundwater and soil in the subsurface. In one embodiment, the target contaminant treatment zone comprises soil in the subsurface. In one embodiment, the target contaminant treatment zone comprises waste water from industrial or municipal processes. In one embodiment, the target contaminant treatment zone comprises soil or solid waste from industrial or municipal processes. In one embodiment, the heat source comprises a heat exchanger that utilizes waste heat from an industrial process stream.

In TISR, the thermal properties of soil are utilized to increase the temperatures of contaminated treatment zones, thus increasing the micro-biological activity and physical and chemical reaction rates such as hydrolysis that helps to attenuate, recover, and remediate the contamination. Heat transport occurs through two processes: conduction through soil solids (soil particles) and water and advection through ambient groundwater flow. Heat transfer in soils and water depends on thermal conductivity and heat capacity of soil and groundwater, respectively. these thermal properties are a function of the soil mineral composition, soil density, porosity and saturation with water or air and can be determined by using well established field and laboratory methods or estimated from the existing scientific literature. Variability in soil properties, depth to groundwater below ground surface and nature of contaminants and clean-up goals are used to determine the design specifics for a given site as can be determined according to known techniques by those skilled in the art. The BHE surface area is adjusted to deliver optimal amount of heat required to provide treatment to the target contaminant treatment zone.

Globally, solar radiation varies based on the distance from the equator as well as seasonal and/or daily weather changes. The surface area of a solar collector for a given site is designed based on the geographical location to account for that variability. Additionally, geothermal heat storage allows for buffering low heat input days caused by low solar radiation on cloudy days and/or due to seasonal changes. After a four to six month period of time (including summer season at a site north of the Tropic of Cancer, in the US), elevated temperatures are believed to be sustained in the subsurface for several months without any solar heat input; the deeper the BHE is placed the longer will be the timeframe for which elevated temperatures should be able to be sustained without additional solar heat input. In one embodiment, the target contaminant zone comprises the geothermal heat storage facility.

Turning to the figures, FIG. 1 depicts a schematic layout according to one embodiment of the system of the invention. TISR system 100 comprises a heat source 110; a plurality of BHEs 120 comprising heat exchanger coils 125 that are shown placed in both vertical and horizontal boreholes; a pump 130; and conveyance piping 140. Further included are shut off/check valves 180 in conveyance piping 140; air traps and vents 185; and filling/drain valves 190. TISR system 100 further comprises flow meter 195; safety relief valve 197; and expansion tank 199. In the event of accidental abnormal high pressures, safety relief valve 197 will open and heat transfer fluids within conveyance piping 140 will directed to a containment tank 155 and thus avoid spills on the ground. Heat source 110 is installed at the ground surface 140 in the proximity of target contaminant treatment zones 150. The target contaminant treatment zones 150 comprise various contaminants. The BHEs 120 heat the surrounding subsurface of the target contaminant treatment zones 150 by thermal conduction, and/or are placed directly in and heat the target contaminant treatment zones 150.

Modelling Results

Figure 2:
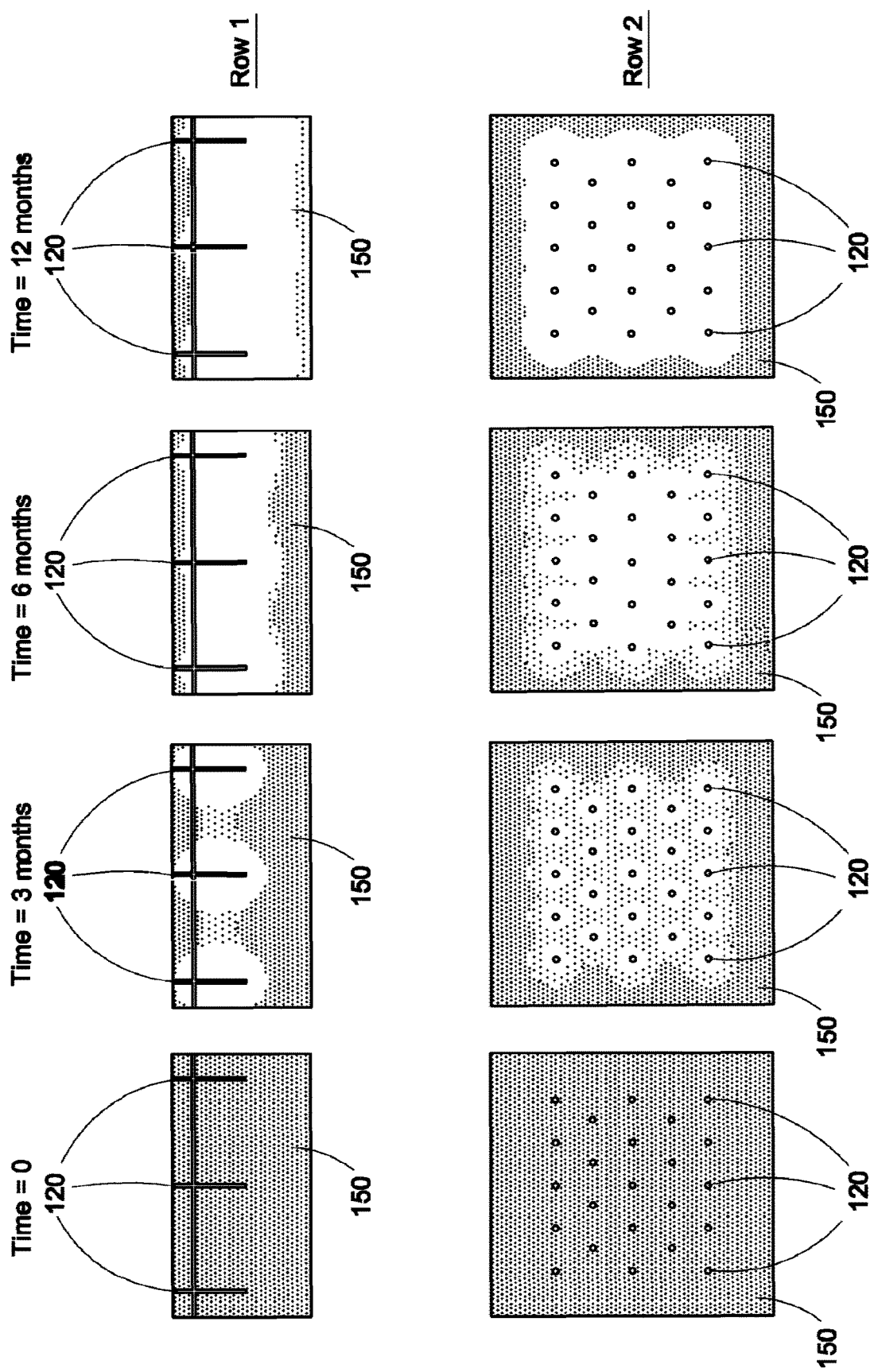
FIG. 2 depicts FlexPDE® 2D modelling results for TISR.

FIG. 2 depicts FlexPDED 2D modelling results for TISR showing contour plots in Row 1 of the vertical profile of heated boreholes with simulated heat transfer over 1 to 12 months. Row 2 shows the same information for the whole site from a plan view. X and Y axis are in meters and temperatures are in ° C. Simulations completed for two, five and ten years of operation (not shown) showed a sustained temperature similar to the 12 months of data. Based on FlexPDEO 2D modelling results as seen in FIG. 2, TISR is predicted to increase subsurface temperatures to 40-70° C. using a closed-loop (no groundwater pumping) heat storage system which in turn induces thermally-enhanced remediation within a target contaminant treatment zone 150. It is estimated that within six months of start-up, BHEs 120 spaced 8 m apart can heat the groundwater between them to 35-40° C. at a depth of 3 m below land surface. This data represented simulations run using a site data from northern Ohio. Geographical location of a subject site will affect these design parameters.

Heat transfer calculations were reviewed (and confirmed via multiple simulations) and revised to provide a basis for development of a conceptual design and approach for implementation.

In the foregoing description, the invention has been described with reference to specific exemplary embodiments thereof. It will be apparent to those skilled in the art that a person understanding this invention may conceive of changes or other embodiments or variations, which utilize the principles of this invention without departing from the broader spirit and scope of the invention. The specification and drawings are, therefore, to be regarded in an illustrative rather than a restrictive sense.

The invention claimed is:

1. A system for remediating contaminants in a contaminated zone comprising:
   a target zone in the subsurface of the ground containing contaminants;
   at least one heat source in the proximity of the target zone derived from at least one process that produces waste heat as a byproduct;
   a plurality of borehole heat exchangers installed in the subsurface in proximity of the target zone;
   piping that connects the at least one heat source to the borehole heat exchangers;
   heat transfer fluid contained within the piping; and
   at least one pump for circulating the heat transfer fluid within the piping,
   wherein heat from the at least one heat source is transferred to the heat transfer fluid, wherein thereafter heat is transferred from the heat transfer fluid to the borehole heat exchangers, wherein thereafter heat is transferred from the borehole heat exchangers to the target zone directly through the borehole heat exchangers to the target zone, thereby increasing the temperature of the target zone and enhancing remediation of contaminants within the target zone,
   wherein remediation is achieved without extraction or removal of the contaminants,
   wherein the plurality of borehole heat exchangers are not used to transfer the contaminants away from the target zone,
   and wherein the remediation of contaminants occurs by increasing subsurface temperatures to between 10 degrees and 100 degrees Celsius.

2. The system of claim 1, wherein the at least one process that produces waste heat comprises at least one catalytic oxidizer.

3. The system of claim 1, wherein the at least one process that produces waste heat comprises at least one thermal oxidizer.

4. The system of claim 1, wherein the at least one process that produces waste heat comprises at least one industrial blower.

5. The system of claim 1, wherein the waste heat from the at least one process is captured and transferred to the heat transfer fluid contained within the piping.

6. The system of claim 1, wherein the remediation occurs by enhancing natural degradation reactions.

7. The system of claim 6, wherein the enhanced natural degradation reaction is air sparging.

8. The system of claim 6, wherein the enhanced natural degradation reaction is soil vapor extraction.

9. The system of claim 6, wherein the enhanced natural degradation reaction is multiphase extraction.

10. The system of claim 6, wherein the enhanced natural degradation reaction is dual phase extraction.

11. The system of claim 6, wherein the enhanced natural degradation reaction is in-situ chemical oxidation.

12. The system of claim 6, wherein the enhanced natural degradation reaction is in-situ bioremediation.

13. The system of claim 1, wherein the remediation occurs by enhancing at least one manufacturing process that relies on at least one of a chemical or biological reaction.

14. The system of claim 1, wherein the target zone further comprises a waste heat storage unit.

15. A method of thermal treatment of contaminants in a contaminated zone, comprising:
   circulating heated heat transfer fluid through a plurality of borehole heat exchangers installed in a target zone, which target zone comprises contaminants to be remediated, the plurality of borehole heat exchangers comprising a plurality of high surface area heating tubes that are located within, or adjacent to, the treatment zone;
   and thereafter heating the target zone directly from the plurality of high surface area heating tubes to the target zone,
   wherein the heat transfer fluid is heated by heat obtained from at least one heat source derived from at least one process that produces waste heat as a byproduct substantially in the proximity of the target zone and circulated from the at least one heat source to the borehole heat exchangers through piping by one or more pumps,
   wherein the heating of the target zone increases reaction rates for contaminant degradation,
   and wherein the plurality of borehole heat exchangers are not used to transfer the contaminants from the target zone.

16. The method of claim 15, wherein the plurality of high surface area heating tubes are substantially U shaped.

17. The method of claim 16, wherein the plurality of substantially U shaped tubes are placed inside a solid thermally conductive material.

18. The method of claim 15, wherein the conductive material comprises at least one of Concrete, a thermal grout, or an epoxy.

19. The method of claim 16, wherein each of the plurality of substantially U shaped heating tubes fits into a well approximately 2 inches in diameter.

20. A system for remediating contaminants in a contaminated zone comprising:
   a target zone in the subsurface of the ground containing contaminants;
   at least one heat source in the proximity of the target zone derived from at least one industrial process that produces waste heat as a byproduct;
   a plurality of borehole heat exchangers installed in the subsurface in proximity of the target zone;
   piping that connects the at least one heat source to the borehole heat exchangers;
   heat transfer fluid contained within the piping; and
   at least one pump for circulating the heat transfer fluid within the piping,
   wherein heat from the at least one heat source is transferred to the heat transfer fluid, wherein thereafter heat is transferred from the heat transfer fluid to the borehole heat exchangers, wherein thereafter heat is transferred from the borehole heat exchangers to the target zone directly through the borehole heat exchangers to the target zone, thereby increasing the temperature of the target zone and enhancing remediation of contaminants within the target zone,
   and wherein the remediation of contaminants occurs by increasing subsurface temperatures to between 10 degrees C. and 100 degrees C.

\* \* \* \* \*